United States Patent [19]

Orgun et al.

[11] Patent Number: 5,020,747

[45] Date of Patent: Jun. 4, 1991

[54] METHOD AND APPARATUS FOR CONTROLLING FLARE ENGAGEMENT HEIGHT IN AUTOMATIC LANDING SYSTEMS

[75] Inventors: Munir Orgun, Woodinville; Venkata R. Pappu, Kirkland; Alfredo A. Toledo, Jr., Seattle, all of Wash.

[73] Assignee: The Boeing Company, Seattle, Wash.

[21] Appl. No.: 470,823

[22] Filed: Jan. 26, 1990

[51] Int. Cl.$^5$ .............................................. G06G 7/78
[52] U.S. Cl. .................................. 244/187; 364/430; 364/428
[58] Field of Search .............. 244/186, 187, 183, 188; 364/428, 429, 430; 73/178 T; 342/411

[56] References Cited

U.S. PATENT DOCUMENTS

| | | | |
|---|---|---|---|
| 3,149,226 | 9/1964 | Campbell | 364/430 |
| 3,892,373 | 7/1975 | Doniger | 244/186 |
| 4,232,839 | 11/1980 | Sieve et al. | 364/430 |
| 4,354,237 | 10/1982 | Lambregts et al. | 244/187 |
| 4,357,661 | 11/1982 | Lambregts et al. | 364/430 |
| 4,763,266 | 8/1988 | Schultz et al. | 364/428 |

*Primary Examiner*—Galen Barefoot
*Attorney, Agent, or Firm*—Christensen, O'Connor, Johnson & Kindness

[57] ABSTRACT

Disclosed is a method of and apparatus for determining the flare height at which the flare maneuver of an automatic landing procedure is initiated. The method includes the step of generating an adjusted approach sink rate signal, which depends on the ground speed of the aircraft during a landing approach and is compensated for short term deviations from the glideslope angle. The adjusted approach sink rate signal is filtered (first order lag), and the filtered signal is then used to establish: (a) a nominal flare height value when the aircraft sink rate is between two predetermined sink rate values (the aircraft landing approach speed is in a nominal range); (b) a flare height that is above the nominal flare height value and is linearly related to the adjusted approach sink rate of the aircraft when the adjusted approach sink rate exceeds the first predetermined value (relatively high ground speed approach); and (c) a flare height that is less than the nominal flare height value and is linearly related to the magnitude of the adjusted approach sink rate signal when the magnitude of the filtered adjusted approach sink rate signal is less than the second predetermined sink rate magnitude (relatively low ground speed approach). In the disclosed arrangements, provision is made to limit the flare height determined by the invention to maximum and minimum flare height values and provision is made for storing the flare height signal for use by the automatic landing system after the flare maneuver has been initiated.

21 Claims, 2 Drawing Sheets

METHOD AND APPARATUS FOR CONTROLLING FLARE ENGAGEMENT HEIGHT IN AUTOMATIC LANDING SYSTEMS

FIELD OF THE INVENTION

This invention relates to aircraft automatic landing systems and, more particularly, to methods and apparatus for initiating flare during an automatic landing procedure.

BACKGROUND OF THE INVENTION

Various automatic landing systems have become available during the past several years, often being incorporated in the aircraft's autopilot or flight control system. Basically, these automatic landing systems are digital signal processors that execute control laws that cause the aircraft to follow glideslope and localizer signals so that the aircraft approaches the destination runway without manual control by the pilot. When the aircraft reaches a suitable point in its descent, the automatic landing system initiates a flare maneuver to arrest aircraft rate of descent (sink rate) so that the aircraft touches down on the runway at a proper position and at a suitable sink rate. In the past, the point at which the automatic landing system initiates the flare maneuver has been based on the aircraft attaining a predetermined altitude. The flare initiation altitude used in these systems depends on the flight characteristics of the aircraft employing the system and is established to allow the automatic landing system to bring the aircraft to a safe landing in all situations in which the automatic landing system is used (i.e., for all ground speeds, aircraft landing weights, sink rates, etc., that are within the aircraft's automatic landing profile). For example, it has been typical practice to initiate an automatic landing flare maneuver when the aircraft landing gear is 50 or 45 feet above the ground, depending upon the particular aircraft of interest.

Initiating automatic landing flare maneuver at a predetermined altitude has certain disadvantages and drawbacks. For example, when an automatic landing is executed in a tail wind, with a heavily loaded aircraft, and/or is executed at a high-density altitude destination (which refers to the altitude of the destination airport adjusted to reflect ambient temperatures greater than standard atmospheric temperature), the aircraft groundspeed is higher than the nominal ground speed for the automatic landing procedure. This means that the aircraft will have a higher than nominal approach sink rate (i.e., will descend at a rate higher than it would during an approach at a nominal ground speed). To arrest the relatively high sink rate, it may be necessary for the automatic landing system to exert fairly aggressive control of the aircraft during the flare maneuver. Moreover, in situations in which the aircraft sink rate cannot be decreased to a low level, the aircraft may make a relatively hard landing. Although automatic landing systems in current use safely land the aircraft under relatively high ground speed approach conditions, the required flare maneuver and/or resulting hard landing may cause an undue degree of passenger concern, apprehension and discomfort.

Initiating an automatic landing flare maneuver at a predetermined altitude also is somewhat disadvantageous when the aircraft executes the automatic landing procedure at a relatively low ground speed because of head winds or a lightly loaded aircraft. When the aircraft ground speed is relatively low, the aircraft descends along the approach path with a lower than nominal approach sink rate. When this occurs, the automatic landing system may control the aircraft in a manner that results in relatively long flare time causing the aircraft crew and passengers to sometimes experience a "floating" sensation. This may cause the pilot to mistakenly believe that the landing will require more than normal runway distance (i.e., the aircraft will land "long"). Such a perception on the part of the pilot can cause unnecessary pilot concern and increases the possibility that the pilot will unnecessarily assume manual control of the aircraft, even when the landing is being executed under low visibility conditions.

For the above reasons, a need exists for methods and apparatus that initiate automatic landing flare maneuver in a manner that better accommodates higher than nominal and lower than nominal approach speeds (i.e., ground speeds that are within system limits, but higher or lower than optimal).

SUMMARY OF THE INVENTION

Provided in accordance with this invention is a method of and apparatus for scheduling the altitude at which flare is initiated during an automatic landing system on the basis of the aircraft ground speed during the landing approach. In effect, in the practice of the invention, the range of ground speeds for the automatic landing system that incorporates the invention is partitioned into: a high ground speed range; a nominal ground speed range; and, a low ground speed range. The nominal ground speed range is selected to encompass landing conditions under which the aircraft executes a relatively soft landing without substantial maneuvering during the aircraft flare procedure and without exhibiting a relatively long flare time. The flare height established by the invention for this nominal ground speed range is a constant landing gear altitude, which generally corresponds to the flare height that would be used under the conventional technique of executing a flare maneuver at a predetermined altitude (e.g., landing gear altitude of 45 or 50 feet). In accordance with the invention, flare height for aircraft ground speed above the nominal ground speed range (i.e., ground speeds within the high ground speed range) is increased as a function of increasing ground speed and flare height for ground speeds below the nominal ground speed range (i.e., ground speeds within the low ground speed range) is decreased as a function of decreasing ground speed.

In accordance with the method of the invention, a signal representative of aircraft ground speed during the approach phase of an automatic landing procedure is processed to provide a signal representative of what is referred to herein as the aircraft "adjusted approach sink rate." As shall be described in more detail, the adjusted approach sink rate in effect corresponds to the average expected sink rate of the aircraft while it is descending along a glideslope beam with compensation being included for deviations from the desired glideslope path (i.e., short term deviations from the glideslope angle that are caused by atmospheric disturbances such as vertical wind gusts). In accordance with the invention, the signal representative of aircraft adjusted approach sink rate is processed to automatically and linearly increase landing flare height as a function of increasing adjusted approach sink rate when the magnitude of the adjusted approach sink rate exceeds a first predetermined value (i.e., when the landing approach ground speed is within the above-defined high ground speed range. Flare height is maintained constant (e.g., at 50 foot landing gear altitude) when adjusted aircraft approach sink rate is less than the first predetermined value and greater than a second predetermined value, i.e., when aircraft ground speed is within the nominal ground speed range. For adjusted approach sink rates that are below the second predetermined value (i.e., sink rates that correspond to ground speeds in the low ground speed range) the signal processing of the invention provides a flare height that linearly decreases relative to the decreasing adjusted approach sink rate. Preferably, the maximum and minimum flare heights that are generated in accordance with the invention are limited to predetermined upper and lower limits. For example, in one realization of the invention, the maximum flare height is limited to 60 feet; the minimum flare height is limited to 40 feet; and the flare height for the nominal range of adjusted approach sink rates is established at 50 feet.

Under the currently preferred practice of the invention, the signal representative of the aircraft adjusted sink rate is filtered to eliminate signal noise prior to implementing the signal processing that produces the flare height initiation signal. In the disclosed method and apparatus, the filter employed is a recursive digital filter that results from a bilinear transformation of the frequency domain transfer function for a first order lag circuit.

It has been found that practice of the invention substantially alleviates previously mentioned disadvantages and drawbacks of automatic landing systems that employ a constant flare height for all landing conditions. In this regard, using an aircraft simulator to execute simulated automatic landings under landing conditions that had been encountered during various aircraft test flights, it was determined that the invention provides substantial improvement both for relatively high ground speed automatic landings and relatively low ground speed automatic landings. In these flight simulations, when a constant flare height was utilized during high ground speed landings, the aircraft sink rate when the aircraft touched down varied between approximately −5.6 and −11.5 feet per second. When the invention was incorporated in the same automatic landing simulations, the aircraft sink rate at touchdown significantly decreased, ranging between approximately −1.8 to −7.1 feet per second. During simulated landings under low approach ground speeds, the average time required for the aircraft to execute the flare maneuver decreased from approximately 11 seconds to 8.5 seconds.

BRIEF DESCRIPTION OF THE DRAWINGS

These and other aspects and advantages of the invention will be more fully understood by reference to the following detailed description when taken in conjunction with the accompany drawings in which.

DETAILED DESCRIPTION

Figure 1:
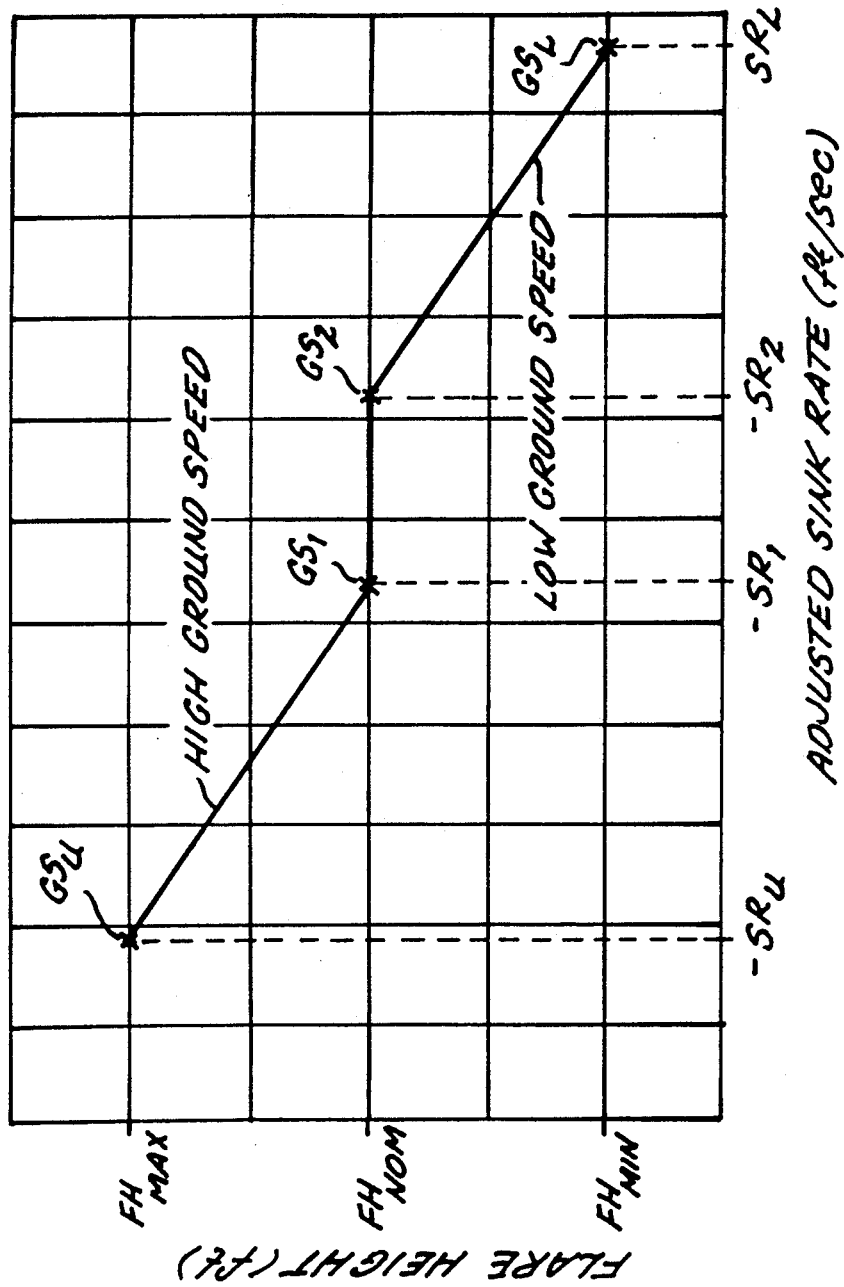
FIG. 1 graphically depicts the flare height-adjusted sink rate relationship that is established under the practice of the invention.

FIG. 1 graphically indicates the manner in which the currently preferred embodiments of the the invention schedule automatic landing flare height as a function of aircraft ground speed during the approach phase of an automatic landing procedure. More specifically, FIG. 1 depicts the relationship between the altitude or height at which the flare maneuver of an automatic landing is initiated relative to the aircraft adjusted sink rate. As shall be described relative to FIG. 2, adjusted approach sink rate is derived from the aircraft ground speed during the landing approach (prior to initiation of the flare maneuver) and glideslope deviation rate.

In FIG. 1, the automatic landing system flare height ranges between a lower limit, $FH_{MIN}$, and an upper limit of $FH_{MAX}$. For sink rates of a magnitude greater than a first predetermined value $SR_U$, flare height is maintained at the upper flare height limit $FH_{MAX}$. For adjusted approach sink rates of magnitude less than the first predetermined limit $SR_U$ and greater than a second predetermined limit $SR_1$, flare height linearly increases as a function of increasing adjusted approach sink rate (i.e., a more rapid rate of aircraft descent results in greater flare height). As is indicated in FIG. 1, sink rates of a magnitude greater than $SR_1$ and less than $SR_U$ fall within a "high ground speed" range in which the landing approach is being made at a ground speed that is within the operational limits of the automatic landing system, but which may result in a fairly aggressive flare maneuver and/or may result in a landing that is harder than desired. For purposes of reference, the high ground speed range can be considered as extending between a ground speed $GS_U$ and a lower ground speed $GS_1$. However, it should be noted that is a specific relationship between the value of aircraft adjusted sink rate and aircraft ground speed exists only under conditions in which the landing is being made in the absence of atmospheric disturbances such as vertical wind gusts that cause the aircraft to deviate from the glideslope beam.

With continued reference to FIG. 1, flare height is constant at a nominal flare height value of $FH_{NOM}$ for all sink rates of a magnitude less than $SR_1$ and greater than $SR_2$. This region of constant flare height, which extends between reference ground speeds $GS_1$ and $GS_2$, encompasses adjusted approach sink rates (and, hence, ground speeds) under which the automatic landing system will execute a relatively smooth flare maneuver and guide the aircraft to a relatively soft landing from a constant flare height. Adjusted approach sink rates of magnitude less than $SR_2$ and greater than a lower limit $SR_L$ are within the low ground speed range of the flare height schedule shown in FIG. 1. In the low ground speed range, which extends between reference ground speed $GS_2$ and a lower ground speed $GS_L$, flare height decreases linearly with decreasing magnitude of adjusted approach sink rate. Flare height remains constant at $FH_{MIN}$ (the flare height value attained when the magnitude of the adjusted approach sink rate is $SR_L$) for all values of $SR_L$ that are of magnitude less than $SR_L$ and are within the operational ground speed range of the automatic landing system.

Figure 2:
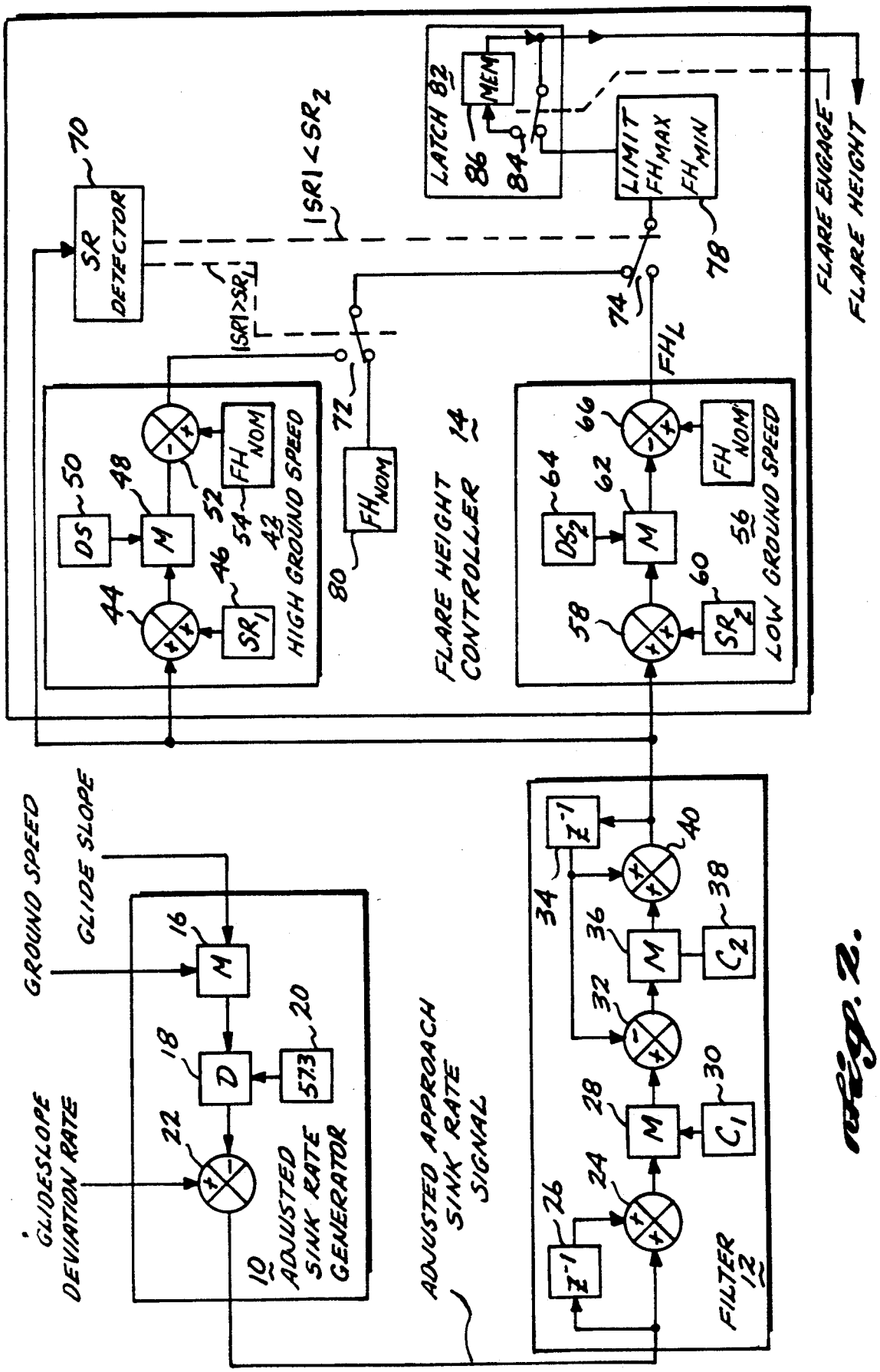
FIG. 2 is a block diagram that depicts the signal processing effected by the invention.

As is illustrated in control law format in FIG. 2, the signal processing that is used in the currently preferred embodiments of the invention basically includes: (a) generating the signal representative of the adjusted approach sink rate (indicated by adjusted approach sink rate generator 10 in FIG. 2); (b) filtering the adjusted approach sink rate (indicated by filter 12); and (c) processing the filtered adjusted approach sink rate signal to determine whether the automatic landing is being made under high ground speed, nominal ground speed or low ground speed conditions and, based on such determination, establishing the flare height at which the flare maneuver will be executed in accordance with the schedule shown in FIG. 1 (indicated by flare height controller 14 in FIG. 2).

Turning first to the signal processing indicated by adjusted sink rate generator 10 of FIG. 2, during the landing approach and all times prior to initiating flare, a signal representative of the current aircraft ground speed is multiplied by a signal representative of the glideslope path, which typically is on the order of 3° (indicated by multiplier 16 in FIG. 2). As is indicated by divider 18 and block 20, the product of the glideslope angle and ground speed signals is then divided by a constant (57.3). As is indicated by adder 22, the signal produced by the division step (divider 18) is subtracted from a signal representative of the aircraft glideslope deviation rate. Such signals are typically available in automatic landing systems, with the currently preferred embodiment of the inventions employing a complementary filtered glideslope deviation rate signal.

It will be recognized that the signal processing discussed relative to sink rate generator 10 provides an adjusted approach sink rate signal of the form $-[(GLS \times GS)/57.3] + GSD$, where GS represents aircraft ground speed, GSD represents the glideslope deviation rate, the constant (57.3) converts the glideslope angle to radians, and, GLS represents the glideslope angle. When this adjusted sink rate signal is multiplied by the aircraft ground speed during the landing approach, an accurate estimate of the magnitude of the aircraft's average rate of descent (sink rate) is obtained. The minus sign in the above set forth expression for adjusted approach sink rate denotes that the aircraft is descending rather than climbing and is obtained in adjusted sink rate generator 10 of FIG. 2 by supplying the signal obtained in the division step (by divider 18) to a subtractive input terminal of the depicted adder 22.

Since the arrangement of adjusted sink rate generator 10 combines the average sink rate signal with the glideslope deviation rate signal (which is representative of aircraft deviation from the glide path in feet per second), it can be recognized that the adjusted approach sink rate signal takes into account short term deviations from the desired glide path. Thus, when the adjusted approach sink rate signal is processed in the manner hereinafter described relative to flare height controller 14 of FIG. 2, any deviation from the glideslope path that occurs when the aircraft is executing a relatively high ground speed automatic landing will result in an additional increase in the flare height signal produced by the invention. That is, if external disturbances such as wind gusts cause a short term deviation from the desired flight path angle, flare will be initiated at a somewhat higher altitude, even when the external disturbances do not cause a change in ground speed. Similarly, when the aircraft is executing an automatic landing at a relatively low ground speed, the invention operates to decrease the flare height, even under conditions in which the external disturbances do not change the aircraft ground speed.

Filter 12 of FIG. 2 is a control law representation of the bilinear transformation of a first order lag circuit, i.e., a circuit having a frequency domain transfer function of $K/(s+K)$, where s is the Laplacian operator and K is a constant. As will be recognized by those skilled in the art, filter 12 is a recursive digital filter, which easily can be implemented in a digital flight control system. During each signal processing iteration, the current value of the adjusted approach sink rate (provided by sink rate generator 10) is summed with the value of the adjusted approach sink rate during the next most antecedent iteration. This operation is indicated in filter 12 of FIG. 2 by adder 24, the input terminals of which are connected for receiving the adjusted approach sink rate signal supplied by sink rate generator 10 and a signal representative of the last most antecedent value of the adjusted approach sink rate signal (represented by the Z transform symbol shown in block 26. The sum of the current and next most antecedent values of the adjusted approach sink rate signal is then multiplied by a first constant $C_1$ (indicated by multiplier 28 and block 30 in FIG. 2). The next step of the filtering process is subtraction of a signal representative of the output signal supplied by filter 12 during the next most antecedent iteration period. This is indicated in FIG. 2 by Z transform block 34, which is connected between the output of filter 12 and a subtractive input of an adder 32, which has an additive input connected to multiplier 28. The signal that results from the subtraction step is then multiplied by a second constant $C_2$ (indicated by multiplier 36 and block 38) and summed with the value of the filter output signal that was obtained during the next most antecedent signal processing iteration (indicated in FIG. 2 by interconnection of Z transform block 34 and multiplier 36 with the two input terminals of an adder 40).

It will be recognized by those skilled in the art that the constants $C_1$ and $C_2$ discussed relative to filter 12 of FIG. 2 relate to the frequency domain transfer function on which the filter arrangement is based and the iteration period of the signal processing system (the computation period used by the automatic landing system for each determination of a filter output value). In the currently preferred embodiments of the invention the frequency domain transfer function for the first order lag effected by filter 12 is $5/(s+5)$. For this transfer function, the digital filtering constant $C_1$ is 0.5 and the digital filtering constant $C_2$ is given by the expression $1 - \exp(-5)$, where DT is the signal processing iteration period used in the filtering operations, and $\exp(-5 DT)$ denotes raising the natural logarithm to the exponential power $(-5 DT)$.

As was previously mentioned, the filtered adjusted sink rate signal provided by filter 12 of FIG. 2 is processed to determine whether the automatic landing system is being made under the previously discussed high ground speed, nominal ground speed or low ground speed conditions and, based on that determination, establishing flare height in accordance with the schedule shown in FIG. 1. High ground speed unit 42 of the flare height controller 14 shown in FIG. 2, illustrates the signal processing that is performed when an automatic landing is made under high ground speed conditions (aircraft adjusted approach sink rate magnitude less than or equal to $SR_U$ and greater than or equal to $SR_1$ in FIG. 1). During high ground speed conditions, the invention operates to add a signal representative of $SR_1$ to the adjusted approach sink rate signal that is supplied by filter 12. In FIG. 2, this is indicated by adder 44 of high ground speed unit 42 which is connected for receiving the adjusted approach sink rate signal and a signal representative of $SR_1$ (indicated by block 46). The signal that results from the addition then is multiplied by a constant, $DS_1$ (which is indicated by a multiplier 48 that is connected in FIG. 2 for receiving the signal supplied by adder 44 and a signal representative of $DS_1$ (indicated by block 50)). As is indicated by adder 52 in FIG. 2, the signal that results from the multiplication (supplied to a substractive input of adder 52 by multiplier 48) is subtracted from a signal representative of the nominal flare height value ($FH_{NOM}$ which is connected to the second additive input of adder 52 and is represented at block 54).

It will be recognized that the arrangement and signal processing described relative to high ground speed unit 42 provides a flare height signal $FH_H$ that can be represented by the equation $$FH_H = FH_{NOM} - DS_1(SR + SR_1)$$

where, SR represents the value of the adjusted approach sink rate, $FH_{NOM}$ represents the previously discussed preselected nominal flare height, $DS_1$ represents the rate of change in flare height magnitude per unit change in adjusted approach sink rate for sink rate values in the range $SR_1$ to $SR_U$, $SR_1$ represents the value of adjusted approach sink rate at which the high ground speed region of operation and the nominal ground speed region of operation intersect. That is, the flare height at $SR_1$ is equal to $FH_{NOM}$, but each sink rate of magnitude greater than the magnitude of $SR_1$ results in a flare altitude greater than $FH_{NOM}$.

Basically, the signal processing implemented by the invention when the aircraft is executing an automatic landing under relatively low ground speed conditions is identical to the above-discussed signal processing for relatively high ground speed automatic landings. Specifically, identical processing steps can be employed using the magnitude of $SR_2$ in place of $SR_1$. Further, in situations such as that shown in FIG. 1 where the rate of increase in flare height per unit increase in the magnitude of sink rate in the low ground speed range differs from the rate of flare height increase in the high ground speed range, it also is necessary to utilize a constant value $DS_2$ that differs from the predetermined constant $DS_1$ used in the low ground speed signal processing.

Since the signal processing for the two ground speed ranges incorporates the same processing steps, low ground speed unit 56 of FIG. 2 is depicted as being identical in topology to high ground speed unit 42. In the depicted arrangement, low ground speed unit 56 includes an adder 58 having its input terminals connected for receiving the adjusted approach sink rate signal and a signal representative of the magnitude of $SR_2$ (indicated at block 60). As was previously mentioned and as can be seen in FIG. 1, $SR_2$ is the sink rate that marks the boundary between the nominal and low ground speed ranges. A multiplier 62 multiplies the signal provided by adder 58 by the previously mentioned predetermined constant $DS_2$ (indicated at block 64) and supplies a signal representative of that product to the subtractive input of an adder 66 that has an additive input connected for receiving a signal representative of the nominal flare height $FH_{NOM}$ (indicated at block 68). Thus, when an automatic landing is made under low ground speed conditions, a flare height $FH_L$ is provided that corresponds to the equation $$FH_L = FH_{NOM} = DS_2(SR + SR_2)$$

where, SR represents the value of the adjusted approach sink rate and the remaining quantities correspond to the above-described predetermined values of sink rate and desired rate of increase in flare height per unit increase in magnitude of sink rate.

The signal processing of the invention that determines whether an automatic landing is being executed under nominal ground speed, high ground speed or low ground speed conditions is illustrated in FIG. 2 by a sink rate detector 70 which operates two switches 72 and 74. The wiper of switch 74 is connected to a limiter 78, which ensures that the flare height signal provided by the invention cannot exceed the maximum flare height $FH_{MAX}$ and cannot be less than the minimum flare height $FH_{MIN}$. Thus, as is shown in FIG. 1, the flare height value for all sink rates of magnitude greater than $SR_U$ will be $FH_{MAX}$ and the flare height for all magnitudes of adjusted approach sink rate less than $SR_L$ will be equal to $FH_{MIN}$. As is indicated in FIG. 2, sink rate detector 70 operates switch 74 so that limiter 78 will receive the ground speed flare height signal $FH_L$ from low ground speed unit 56 when the magnitude of the adjusted approach sink rate signal is less than $SR_2$. For all adjusted approach sink rates of magnitude greater than or equal to $SR_1$, switch 74 interconnects limiter 78 with the wiper of switch 72. As is indicated in FIG. 2, when the magnitude of the adjusted approach sink rate is greater than $SR_1$, sink rate detector 70 operates switch 72 so that the flare height signal $FH_H$ supplied by high ground speed unit 42 is supplied to limiter 78 via switch 74.

When the magnitude of the adjusted approach sink rate is neither less than $SR_2$ nor greater than $SR_1$, the aircraft is executing an automatic landing within the nominal ground speed range of FIG. 1. Under such conditions, a signal representative of the nominal flare height $FH_{NOM}$ (indicated at block 80 in FIG. 2), is supplied to limiter 78 via switches 72 and 74.

In at least some automatic landing systems, the height at which the flare maneuver is initiated is employed to establish open loop gains and/or feedback compensation in control laws that are used for controlling the aircraft during the flare maneuver. Thus, in the currently preferred practice of the invention, the flare height established by the invention is stored for use by the automatic landing system during the remaining portion of the landing procedure. This storage of the flare height initiation value is initiated is indicated in FIG. 2 by a latch circuit 82, which includes a switch 84 and a memory location 86 (i.e., a suitable portion of the automatic landing system memory). As is indicated in FIG. 2, switch 84 is operated upon initiation of the flare maneuver (i.e., "flare engage"). Prior to initiation of flare, the flare height signal provided by limiter 78 is coupled to memory location 86 via switch 84, i.e., memory location 86 is updated with each iteration of the above-described signal processing. When the aircraft reaches the flare height altitude, switch 84 is activated so that the height at which flare was initiated remains stored in memory location 86.

It will be recognized by those skilled in the art that various changes and modifications can be made in the methods and apparatus described herein without departing from the scope and spirit of the invention. For example, in many situations, the glideslope signal that is used in generating the adjusted approach sink rate signal can be set to a nominal value such as 3° (which corresponds to the nominal glide path for currently available landing facilities). Further, although discussed herein in terms of specific control block diagrams, it will be recognized by those skilled in the art, that the disclosed signal processing (and equivalent processing) can be implemented in various ways, including a wide range of specifically configured logic circuits and by a variety of programs that control the operation of digital automatic landing systems, autopilots and flight control systems.

The embodiments of the invention in which an exclusive property or privilege is claimed are defined as follows:

1. A signal processing method for establishing aircraft flare height during an automatic landing procedure, said method comprising:

generating a sink rate signal representative of the descent rate of the aircraft during the approach phase of an automatic landing procedure;

detecting the magnitude of said sink rate signal relative to two predetermined sink rate magnitudes $SR_1$ and $SR_2$, where the magnitude of $SR_1$ is greater than the magnitude of $SR_2$;

establishing said aircraft flare height at a first predetermined value $FH_{NOM}$ when the magnitude of said sink rate signal is greater than said sink rate magnitude $SR_2$ and does not exceed said predetermined sink rate magnitude $SR_1$;

establishing said aircraft flare height in accordance with the relationship $FH = FH_{NOM} - DS_1(SR_1 + SR)$, when said magnitude of said sink rate exceeds said predetermined sink rate magnitude $SR_1$ and where SR denotes the value of said sink rate signal, $DS_2$ represents a first predetermined rate of change of aircraft flare height per unit change in said sink rate magnitude and $FH_{NOM}$ represents said first predetermined flare height; and establishing said aircraft flare height in accordance with the relationship $FH = FH_{NOM} - DS_2(SR_2 + SR)$, when said magnitude of said aircraft sink rate is less than said predetermined sink rate magnitude $SR_2$ and where $FH_{NOM}$ represents said first predetermined aircraft flare height, $DS_2$ represents a second predetermined rate of change in said aircraft flare height per unit change in said magnitude of said sink rate signal and SR represents the value of said signal representative of said aircraft sink rate.

2. The signal processing method of claim 1, further comprising the steps of:

limiting said aircraft flare height to a second predetermined flare height $FH_{MAX}$ that is greater than said first predetermined flare height value $FH_{NOM}$ when said magnitude of said signal representative of said flare height exceeds a third predetermined sink rate magnitude $SR_U$ that is greater than said predetermined sink rate magnitude $SR_1$; and limiting said flare height value to a third predetermined flare height $FH_{MIN}$ that is less than said first predetermined flare height value $FH_{NOM}$ when said magnitude of said sink rate signal is less than a fourth predetermined sink rate magnitude $SR_L$ that is less than said predetermined sink rate magnitude $SR_2$.

3. The signal processing method of claim 2, wherein the step of generating said sink rate signal includes the steps of determining the average expected sink rate of said aircraft on the basis of the ground speed of said aircraft and the glideslope angle for said automatic landing procedure; and combining said signal representative of said average expected sink rate with a signal representative of the deviation of said aircraft from said glideslope angle.

4. The signal processing method of claim 1, wherein the step of generating said sink rate signal includes the steps of determining the average expected sink rate of said aircraft on the basis of the ground speed of said aircraft and the glideslope angle for said automatic landing procedure; and combining said signal representative of said average expected sink rate with a signal representative of the deviation of said aircraft from said glideslope angle.

5. The method of claim 4, further comprising the steps of filtering said sink rate signal prior to said steps of establishing the value of said aircraft flare height.

6. The method of claim 1, further comprising the steps of filtering said sink rate signal prior to said steps of establishing the value of said aircraft flare height.

7. The signal processing method of claim 6, wherein the step of generating said sink rate signal includes the steps of determining the average expected sink rate of said aircraft on the basis of the ground speed of said aircraft and the glideslope angle for said automatic landing procedure; and combining said signal representative of said average expected sink rate with a signal representative of the deviation of said aircraft from said glideslope angle.

8. The signal processing method of claim 7, further comprising the steps of:

limiting said aircraft flare height to a second predetermined flare height $FH_{MAX}$ that is greater than said first predetermined flare height value $FH_{NOM}$ when said magnitude of said signal representative of said flare height exceeds a third predetermined sink rate magnitude $SR_U$ that is greater than said predetermined sink rate magnitude $SR_1$; and limiting said flare height value to a third predetermined flare height $FH_{MIN}$ that is less than said first predetermined flare height value $FH_{NOM}$ when said magnitude of said sink rate signal is less than a fourth predetermined sink rate magnitude $SR_L$ that is less than said predetermined sink rate magnitude $SR_2$.

9. In an automatic landing system that utilizes signals representative of aircraft attitude and flight conditions, including ground speed and deviation of the aircraft from a glideslope angle, the improvement comprising means for establishing flare height during an automatic landing on the basis of at least said signal representative of aircraft ground speed, said means for establishing flare height including:

means responsive to said ground speed signal for generating a signal representative of the sink rate of said aircraft as it executes a landing approach;

detection means for determining the relationship between the magnitude of said signal representative of said sink rate and first and second sink rate magnitudes $SR_1$ and $SR_2$, where $SR_1$ is greater than $SR_2$ and $SR_1$ and $SR_2$ collectively define a nominal range of ground speeds for automatic landings executed by said automatic landing system; said detection means producing one or more detection signals representative of whether said magnitude of said sink rate signal is within the range of sink rate magnitudes defined by said first predetermined sink rate magnitude $SR_1$ and said second predetermine sink rate magnitude $SR_2$, is greater than said first predetermined sink rate magnitude $SR_1$, or is less than said second predetermined sink rate magnitude $SR_2$;

high ground speed flare height means for establishing said value of said aircraft flare height when said magnitude of said sink rate signal exceeds said first predetermined sink rate magnitude $SR_1$, said high ground speed flare height means including first and second adder means and a multiplier means, said first adder means being responsive to said signal representative of said aircraft sink rate for supplying a signal representative of the sum of said first predetermined sink rate magnitude $SR_1$ and said signal representative of said aircraft sink rate, said first multiplier means being coupled to said first adder means for multiplying said signal supplied by said first adder means by a predetermined constant $DS_1$ which represents a predetermined rate of change in aircraft flare height relative to incremental change in aircraft sink rate, said multiplier means supplying a signal representative of said product to said second adder means; said second adder means for subtracting said signal supplied by said multiplier means from a signal representative of a first predetermined flare height, $FH_{NOM}$, to supply a first flare height signal $FH_H$;

low ground speed flare height means for establishing said value of said aircraft flare height when said magnitude of said sink rate signal is less than said second predetermined sink rate magnitude $SR_2$, said low ground speed flare height means including first and second adder means and a multiplier means, said first adder means being responsive to said signal representative of said aircraft sink rate for supplying a signal representative of the sum of said second predetermined sink rate magnitude $SR_1$ and said signal representative of said said aircraft sink rate, said first multiplier means being coupled to said first adder means for multiplying said signal supplied by said first adder means by a predetermined constant $DS_2$ which represents a predetermined rate of change in aircraft flare height relative to incremental change in aircraft sink rate, said multiplier means supplying a signal representative of said product to said second adder means; said second adder means for subtracting said signal supplied by said multiplier means from a signal representative of a first predetermined flare height, $FH_{NOM}$, to supply a second flare height signal $FH_L$;

means for supplying a third flare height signal $FH_{NOM}$, representative of said first predetermined flare height value; and selection means responsive to said one or more signals supplied by said detector means, said selection means including means for selecting said first flare height signal $FH_H$ when said magnitude of said aircraft sink rate signal exceeds said first predetermined magnitude $SR_1$, means for selecting said second flare height signal $FH_L$ when said magnitude of said signal representative of said aircraft sink rate is less than said second predetermined sink rate magnitude $SR_2$, and means for selecting said third flare height signal $FH_{NOM}$ when said magnitude of said sink rate signal exceeds neither said first predetermined sink rate signal $SR_1$ nor said second predetermined sink rate signal $SR_2$.

10. The improvement of claim 9, wherein said means for generating said signal representative of said sink rate of said aircraft includes multiplier means for multiplying said signal representative of said ground speed by a signal representative of the glideslope angle for said automatic landing procedure; means for processing the signal supplied by said multiplier to supply a signal representative of the average expected sink rate of said aircraft along said glideslope angle; and means for adding said signal representative of said expected average sink rate to said signal representative of said aircraft deviation from said glideslope path.

11. The improvement of claim 10, further comprising limiter means for limiting said flare height to a second predetermined value $FH_{MAX}$, which is greater than said first predetermined value $FH_{NOM}$ when said magnitude of said signal representative of said aircraft sink rate exceeds a third predetermined value $SR_U$ that is greater than said first predetermined value $SR_1$ and for limiting said flare height to a third predetermined value $FH_{MIN}$, which is less than said second sink rate magnitude $SR_2$, when said signal representative of said aircraft sink rate is less than a fourth predetermined sink rate magnitude $SR_L$.

12. The improvement of claim 11, further comprising means for storing the value of said flare height that exists at the time said automatic landing system initiates said aircraft flare maneuver, said means for storing said value maintaining said value throughout said automatic landing procedure.

13. The improvement of claim 12, further comprising filter means for filtering said signal representative of said aircraft sink rate, said filter means coupled to said means for supplying said signal representative of said aircraft sink rate and being coupled to supply a filtered signal to said detection means, said high ground speed flare height means and said low ground speed flare height means.

14. The improvement of claim 9, further comprising filter means for filtering said signal representative of said aircraft sink rate, said filter means coupled to said means for supplying said signal representative of said aircraft sink rate and being coupled to supply a filtered signal to said detection means, said high ground speed flare height means and said low ground speed flare height means.

15. The improvement of claim 14, further comprising limiter means for limiting said flare height to a second predetermined value $FH_{MAX}$, which is greater than said first predetermined value $FH_{NOM}$ when said magnitude of said signal representative of said aircraft sink rate exceeds a third predetermined value $SR_U$ that is greater than said first predetermined value $SR_1$ and for limiting said flare height to a third predetermined value $FH_{MIN}$, which is less than said second sink rate magnitude $SR_2$, when said signal representative of said aircraft sink rate is less than a fourth predetermined sink rate magnitude $SR_L$.

16. The improvement of claim 15, wherein said means for generating said signal representative of said sink rate of said aircraft includes multiplier means for multiplying said signal representative of said ground speed by a signal representative of the glideslope angle for said automatic landing procedure; means for processing the signal supplied by said multiplier to supply a signal representative of the average expected sink rate of said aircraft along said glideslope angle; and means for adding said signal representative of said expected average sink rate to said signal representative of said aircraft deviation from said glideslope path.

17. The improvement of claim 12, further comprising means for storing the value of said flare height that exists at the time said automatic landing system initiates said aircraft flare maneuver, said means for storing said value maintaining said value throughout said automatic landing procedure.

18. The improvement of claim 9, further comprising limiter means for limiting said flare height to a second predetermined value $FH_{MAX}$, which is greater than said first predetermined value $FH_{NOM}$ when said magnitude of said signal representative of said aircraft sink rate exceeds a third predetermined value $SR_U$ that is greater than said first predetermined value $SR_1$ and for limiting said flare height to a third predetermined value $FH_{MIN}$, which is less than said second sink rate magnitude $SR_2$, when said signal representative of said aircraft sink rate is less than a fourth predetermined sink rate magnitude $SR_L$.

19. The improvement of claim 18, wherein said means for generating said signal representative of said sink rate of said aircraft includes multiplier means for multiplying said signal representative of said ground speed by a signal representative of the glideslope angle for said automatic landing procedure; means for processing the signal supplied by said multiplier to supply a signal representative of the average expected sink rate of said aircraft along said glideslope angle; and means for adding said signal representative of said expected average sink rate to said signal representative of said aircraft deviation from said glideslope path.

20. The improvement of claim 19, further comprising filter means for filtering said signal representative of said aircraft sink rate, said filter means coupled to said means for supplying said signal representative of said aircraft sink rate and being coupled to supply a filtered signal to said detection means, said high ground speed flare height means and said low ground speed flare height means.

21. The improvement of claim 20, further comprising means for storing the value of said flare height that exists at the time said automatic landing system initiates said aircraft flare maneuver, said means for storing said value maintaining said value throughout said automatic landing procedure.

* * * * *